US012768000B2

(12) United States Patent
Kwon et al.

(10) Patent No.: US 12,768,000 B2
(45) Date of Patent: Oct. 20, 2026

(54) ULTRA HIGH STRENGTH COLD ROLLED STEEL SHEET HAVING EXCELLENT SPOT WELDABILITY AND FORMABILITY, ULTRA HIGH STRENGTH PLATED STEEL SHEET AND MANUFACTURING METHOD THEREFOR

(71) Applicant: Hyundai Steel Company, Incheon (KR)

(72) Inventors: Sun Hwan Kwon, Hwaseong (KR); Jin Sung Park, Asan (KR); Hye Jin Kim, Hanam (KR)

(73) Assignee: HYUNDAI STEEL COMPANY, Incheon (KR)

( * ) Notice: Subject to any disclaimer, the term of this patent is extended or adjusted under 35 U.S.C. 154(b) by 155 days.

(21) Appl. No.: 17/922,038

(22) PCT Filed: Dec. 21, 2021

(86) PCT No.: PCT/KR2021/019487
§ 371 (c)(1),
(2) Date: Oct. 28, 2022

(87) PCT Pub. No.: WO2022/139400
PCT Pub. Date: Jun. 30, 2022

(65) Prior Publication Data

US 2023/0265536 A1 Aug. 24, 2023

(30) Foreign Application Priority Data

Dec. 21, 2020 (KR) ........................ 10-2020-0180087

(51) Int. Cl.
*C22C 38/02* (2006.01)
*B32B 15/01* (2006.01)
(Continued)

(52) U.S. Cl.
CPC .............. *C21D 9/46* (2013.01); *B32B 15/013* (2013.01); *C21D 6/002* (2013.01); *C21D 6/005* (2013.01);
(Continued)

(58) Field of Classification Search
CPC ....... C22C 38/001; C22C 38/02; C22C 38/04; C22C 38/06; C22C 38/22; C22C 38/28; C22C 38/32; C21D 9/46; C21D 1/18
See application file for complete search history.

(56) References Cited

U.S. PATENT DOCUMENTS 10,889,873 B2 1/2021 An et al.
11,066,716 B2 7/2021 Kohsaka et al.
(Continued)

FOREIGN PATENT DOCUMENTS

CN 101326299 A 12/2008
KR 20140047960 A 4/2014
(Continued)

OTHER PUBLICATIONS

Office Action issued Sep. 6, 2023 in corresponding Chinese Application No. 202180032656.X.
(Continued)

*Primary Examiner* — Adam Krupicka
(74) *Attorney, Agent, or Firm* — Fox Rothschild LLP

(57) ABSTRACT

The present invention provides an ultra high strength cold rolled steel sheet having excellent spot weldability and formability. The ultra high strength cold rolled steel sheet, according to one embodiment of the present invention, comprises, in weight percent: 0.05% to 0.09% of carbon (C); 0.5% to 1.0% of silicon (Si); 2.0% to 2.8% of manganese (Mn); 0.2% to 0.5% of aluminum (Al); 0.8% to 1.2% of chromium (Cr); 0.05% to 0.10% of molybdenum (Mo); 0.03% to 0.06% of titanium (Ti); 0.001% to 0.003% of
(Continued)

boron (B); 0.02% to 0.05% of antimony (Sb); 0.001% to 0.015% of phosphorus (P); more than 0% to 0.003% of sulfur (S); 0.004% to 0.006% of nitrogen (N); and a balance of iron (Fe) and other inevitable impurities, and the ultra high strength cold rolled steel sheet comprises a microstructure comprising ferrite and low hardness martensite.

12 Claims, 9 Drawing Sheets

(51) Int. Cl.

| | |
|---|---|
| ***C21D 6/00*** | (2006.01) |
| ***C21D 8/04*** | (2006.01) |
| ***C21D 9/46*** | (2006.01) |
| ***C22C 38/04*** | (2006.01) |
| ***C22C 38/06*** | (2006.01) |
| ***C22C 38/22*** | (2006.01) |
| ***C22C 38/28*** | (2006.01) |
| ***C22C 38/38*** | (2006.01) |
| ***C23C 2/28*** | (2006.01) |

(52) U.S. Cl.

CPC ............... *C21D 6/008* (2013.01); *C21D 8/04* (2013.01); *C21D 8/0426* (2013.01); *C21D 8/0436* (2013.01); *C21D 8/0463* (2013.01); *C22C 38/02* (2013.01); *C22C 38/06* (2013.01); *C22C 38/22* (2013.01); *C22C 38/28* (2013.01); *C22C 38/38* (2013.01); *C23C 2/28* (2013.01); *C23C 2/29* (2022.08)

(56) References Cited

U.S. PATENT DOCUMENTS

| | | | | |
|---|---|---|---|---|
| 11,118,252 | B2 | 9/2021 | Sano et al. | |
| 2016/0186285 | A1 | 6/2016 | Kim et al. | |
| 2019/0003008 | A1 | 1/2019 | Gospodinova et al. | |
| 2019/0100819 | A1 * | 4/2019 | Minami | C23C 30/00 |
| 2020/0347476 | A1 | 11/2020 | Ahn et al. | |
| 2021/0047716 | A1 * | 2/2021 | Sano | C23C 2/40 |

FOREIGN PATENT DOCUMENTS

| | | | |
|---|---|---|---|
| KR | 101630975 | B1 | 6/2016 |
| KR | 20160078570 | A | 7/2016 |
| KR | 101726130 | B1 | 4/2017 |
| KR | 20190022769 | A | 3/2019 |
| KR | 20190076307 | A | 7/2019 |
| KR | 10-2020-0077040 | A | 6/2020 |
| KR | 20200120954 | A | 10/2020 |

OTHER PUBLICATIONS

International Search Report issued Mar. 31, 2022 in PCT Application No. PCT/KR2021/019487.

Office Action dated Dec. 10, 2025, in Indian Patent Application No. 202217062834.

* cited by examiner

ULTRA HIGH STRENGTH COLD ROLLED STEEL SHEET HAVING EXCELLENT SPOT WELDABILITY AND FORMABILITY, ULTRA HIGH STRENGTH PLATED STEEL SHEET AND MANUFACTURING METHOD THEREFOR

This application is a National Stage Application pursuant to 35 U.S.C. § 371, of United States International Application No. PCT/KR2021/019487, filed Dec. 21, 2021, which claims priority to Korean n Patent Application No. 10-2020-0180087, filed Dec. 21, 2020. The entire contents of which are incorporated herein by reference in their entirety.

TECHNICAL FIELD

The technical spirit of the present invention relates to a cold rolled steel sheet, and more particularly, to an ultra-high strength cold rolled steel sheet having excellent spot weldability and formability, an ultra-high strength plated steel sheet, and manufacturing methods thereof.

BACKGROUND

In order to respond to market demands for strengthening automobile collision laws and improving fuel efficiency, the application rate of ultra-high tensile strength steel materials for automotive body structural reinforcement is expanding. As the application rate of ultra-high strength steel for parts with complex shapes increases, each automobile manufacturer is demanding the development of materials with improved formability, and accordingly, a steel sheet having improved elongation and hole expandability compared to conventional steel materials is being developed.

Such steel materials can improve elongation by securing a retained austenite (RA) phase that is stable at room temperature, and can contain large amounts of elements such as carbon (C), silicon (Si), manganese (Mn), and the like that are necessary in order to stabilize the retained austenite phase. However, the carbon equivalent of the steel materials is relatively increased so that spot weldability may be reduced.

Among various ultra-high strength steels, dual phase (DP) steel is steel in which hard martensite is distributed in a soft ferrite matrix, and it is the most used steel for automobiles because of its excellent combination of strength and ductility. However, in the case of forming general dual phase steel into a part by a bending or stretch flanging process, it is necessary to improve such a formability problem in order to further expand the application rate of ultra-high strength steel because machining cracks are easy to occur.

Automobile parts are mainly formed by draw, bending, and stretch flanging processes. Since the deformation propagates throughout the steel sheet during forming when the automobile parts are manufactured by the draw process, the higher the elongation of the steel sheet, the more advantageous the forming is. However, since the strain is locally concentrated in the steel material when the parts are manufactured by bending or stretch flanging process, high local elongation is required. In general, in dual phase steel composed of ferrite and martensite, the interphase hardness difference is large, and stress is concentrated at ferrite and martensite grain boundaries during deformation to cause cracks so that the local elongation deteriorates.

In order to compensate for this, it was applied to parts requiring bending and hole expansion characteristics by developing complex phase (CP) steel having reduced interphase hardness difference by allowing an intermediate phase of bainite to be included between ferrite and martensite. However, there is a problem in that the elongation is reduced due to the introduction of the bainite phase, which is relatively light compared to ferrite, and CP steel has a limited disadvantage in the application of parts.

PRIOR ART DOCUMENTS

Korean Patent Application No. 10-2016-0078570

SUMMARY

Technical Problem

The technical problem to be achieved by the technical spirit of the present invention is to provide an ultra-high strength cold rolled steel sheet having excellent spot weldability and formability, an ultra-high strength plated steel sheet, and manufacturing methods thereof.

However, these tasks are exemplary, and the technical spirit of the present invention is not limited thereto

Technical Solution

According to one aspect of the present invention, there are provided an ultra-high strength cold rolled steel sheet having excellent spot weldability and formability, an ultra-high strength plated steel sheet, and manufacturing methods thereof.

According to one embodiment of the present invention, the ultra-high strength cold rolled steel sheet may comprise, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur (S), 0.004% to 0.006% of nitrogen (N), and the balance of iron (Fe) and other unavoidable impurities, and include a microstructure composed of ferrite and low hardness martensite.

According to one embodiment of the present invention, the average interphase hardness difference between ferrite and low hardness martensite may be in a range of more than 0 GPa to 1.0 GPa.

According to one embodiment of the present invention, ferrite may have a fraction in a range of 50% to 60%, and low hardness martensite may have a fraction in a range of 40% to 50%.

According to one embodiment of the present invention, ferrite or low hardness martensite may have a crystal grain size in a range of 1 μm to 5 μm.

According to one embodiment of the present invention, low hardness martensite may have an average hardness in a range of 3.5 GPa to 4.5 GPa.

According to one embodiment of the present invention, the ratio of the average hardness of ferrite to the average hardness of low hardness martensite may be in a range of 70% to less than 100%.

According to one embodiment of the present invention, low hardness martensite is composed of a first low hardness martensite and a second low hardness martensite, the first low hardness martensite is spaced apart by ferrite, and the second low hardness martensite is formed at a crystal grain boundary of ferrite to connect the first low hardness martensite so that a mesh structure may be formed.

According to one embodiment of the present invention, the second low hardness martensite may have a ratio of the minor axis length to the major axis length in a range of 0.5 to 1.0.

According to one embodiment of the present invention, ferrite, low hardness martensite, or both thereof may include titanium precipitates.

According to one embodiment of the present invention, the ultra-high strength cold rolled steel sheet may have a carbon equivalent in a range of 0.20 to 0.25. (where $C_{eq}$= [C]+[Si]/30+[Mn]/20+2[P]+4[S])

According to one embodiment of the present invention, the ultra-high strength cold rolled steel sheet may comprise 0.01 wt % to 0.04 wt % of effective titanium dissolved in solid solution.

According to one embodiment of the present invention, the ultra-high strength cold rolled steel sheet may satisfy a yield strength (YP) of 480 MPa or more, a tensile strength (TS) of 820 MPa or more, an elongation (El) of 5% or more, and a bendability (R/t) at an angle of 60 degrees of 2.5 or less.

According to one embodiment of the present invention, the ultra-high strength cold rolled steel sheet may satisfy a yield strength (YS) of 480 MPa to 810 MPa, a tensile strength (TS) of 820 MPa to 1,300 MPa, an elongation (EL) of 5% to 20%, and a bendability (R/t) at an angle of 60 degrees of 0.3 to 2.5.

According to one embodiment of the present invention, the ultra-high strength cold rolled steel sheet may satisfy a VDA bending angle in the vertical direction of 90 degrees to 130 degrees, a VDA bending angle in the parallel direction of 70 degrees to 105 degrees, a punch hole expandability of 30% to 70%, a wire hole expandability of 70% to 160%, an LDH of 40 to 60, and an LDR of 90 to 130.

According to one embodiment of the present invention, a method for manufacturing the ultra-high strength cold rolled steel sheet may comprise the steps of: manufacturing a hot rolled steel sheet comprising, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur (S), 0.004% to 0.006% of nitrogen (N), and the balance of iron (Fe) and other unavoidable impurities; manufacturing a cold rolled steel sheet by cold rolling the hot rolled steel sheet; heating the cold rolled steel sheet at a temperature raising rate in a range of 3° C./sec to 20° C./sec to annealing heat-treat the cold rolled steel sheet at a temperature in a range of 790° C. to 840° C.; multistage-cooling the annealing heat-treated cold rolled steel sheet; and subjecting the multistage-cooled cold rolled steel sheet to an over-aging heat treatment so that the over-aging heat treatment is finished at a temperature in a range of 250° C. to 350° C.

According to one embodiment of the present invention, the step of manufacturing of the hot rolled steel sheet may include the steps of: preparing a steel material having the alloy composition; reheating the steel material in a range of 1,180° C. to 1,220° C.; manufacturing a hot rolled steel sheet by hot finish rolling the reheated steel material at a finish rolling end temperature in a range of 880° C. to 950° C.; and cooling the hot rolled steel sheet at a cooling rate of 5° C./sec to 150° C./sec and coiling the cooled-hot rolled steel sheet in a range of 400° C. to 700° C.

According to one embodiment of the present invention, the multistage cooling step may include the steps of: primarily cooling the annealing heat-treated cold rolled steel sheet to a primary cooling end temperature of 600° C. to 700° C. at a cooling rate in a range of 1° C./sec to 10° C./sec; and secondarily cooling the primarily cooled cold rolled steel sheet to a secondary cooling end temperature of 300° C. to 400° C. at a cooling rate in a range of 5° C./sec to 50° C./sec.

According to one embodiment of the present invention, an ultra-high strength plated steel sheet may comprise: a base steel sheet; and a hot-dip galvanized layer or alloyed hot-dip galvanized layer formed on the surface of the base steel sheet, wherein the base steel sheet may comprise, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur (S), 0.004% to 0.006% of nitrogen (N), and the balance of iron (Fe) and other unavoidable impurities, and include a microstructure composed of ferrite and low hardness martensite, and the average interphase hardness difference between ferrite and low hardness martensite may be in a range of more than 0 GPa to 1.0 GPa.

According to one embodiment of the present invention, a method for manufacturing the ultra-high strength plated steel sheet may comprise the steps of: manufacturing a hot rolled steel sheet comprising, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur (S), 0.004% to 0.006% of nitrogen (N), and the balance of iron (Fe) and other unavoidable impurities; manufacturing a cold rolled steel sheet by cold rolling the hot rolled steel sheet; heating the cold rolled steel sheet at a temperature raising rate in a range of 3° C./sec to 20° C./sec to annealing heat-treat the cold rolled steel sheet at a temperature in a range of 790° C. to 840° C.; multistage-cooling the annealing heat-treated cold rolled steel sheet; hot-dip galvanizing the multistage-cooled cold rolled steel sheet at a temperature in a range of 460° C. to 500° C.; and finally cooling the hot-dip galvanized cold rolled steel sheet to a temperature in a range of 0° C. to 40° C.

According to one embodiment of the present invention, the method may further comprise a step of alloying heat-treating the hot-dip galvanized cold rolled steel sheet at a temperature in a range of 490° C. to 600° C. after performing the hot-dip galvanizing step.

Advantageous Effects

According to the technical spirit of the present invention, it is possible to improve the press formability by utilizing a dual phase structure to secure low yield and high ductility. In addition, the interphase hardness difference between ferrite and martensite structures in the dual phase structure is reduced, and thus the hole expandability can be improved so that stretch flanging properties can be improved. In addition, it is possible to provide excellent spot weldability due to a low carbon content. In addition, the flatness of the steel sheet is excellent by forming a hard phase such as martensite at a low cooling rate of 50° C./sec or less.

Conventional dual phase steel has increased hole expandability by forming bainite, but there is a limitation in that elongation is lowered. On the other hand, the ultra-high strength cold rolled steel sheet according to the present invention does not contain bainite and instead forms low hardness martensite to enable an increase in elongation along with an increase in hole expandability to be realized. Since low hardness martensite has a low hardness, it is possible to deform low hardness martensite to a certain level together with ferrite, thereby enabling the elongation to be increased.

The ultra-high strength cold rolled steel sheet according to the present invention has excellent VDA bending properties to have excellent collision toughness properties at the time of automobile collision, and since it has excellent bending, hole expansion and elongation to have excellent stretch flange properties, excellent formability can be ensured when forming automobile parts.

The above-described effects of the present invention have been described exemplarily, and the scope of the present invention is not limited by these effects.

DETAILED DESCRIPTION

Figure 1:
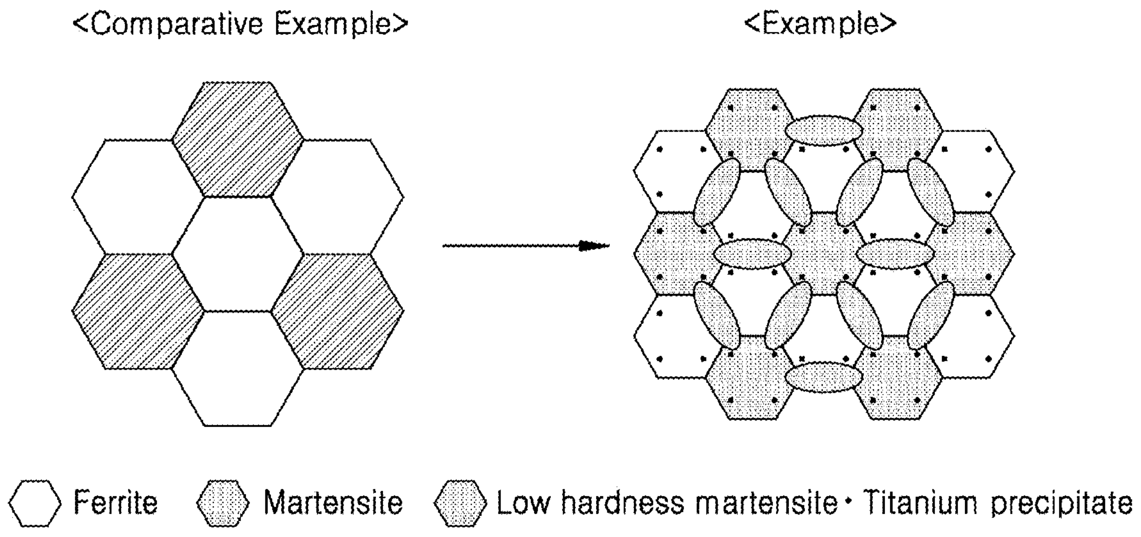
FIG. 1 is a schematic diagram showing the microstructure of an ultra-high strength cold rolled steel sheet according to one embodiment of the present invention.

Hereinafter, preferred embodiments of the present invention will be described in detail with reference to the accompanying drawings. The embodiments of the present invention are provided to more completely explain the technical spirit of the present invention to those of ordinary skill in the art, the following embodiments may be modified in various other forms, and the scope of the technical spirit of the present invention is not limited to the following embodiments. Rather, these embodiments are provided so as to make the present disclosure more faithful and complete, and to fully convey the technical spirit of the present invention to those skilled in the art. In the present specification, the same reference numerals refer to the same elements throughout. Furthermore, various elements and regions in the drawings are schematically drawn. Accordingly, the technical spirit of the present invention is not limited by the relative size or spacing drawn in the accompanying drawings.

The technical spirit of the present invention is to provide an ultra-high strength cold rolled steel sheet having excellent spot weldability and formability so as to be applicable to automobile parts, and the like and manufacturing methods thereof, and to provide an ultra-high strength cold rolled steel sheet with excellent stretch flanging properties, elongation, and V bendability (impact toughness).

According to the technical spirit of the present invention, the ultra-high strength cold rolled steel sheet is designed to have a carbon content of 0.09 wt % or less to reduce the martensitic strength after the final heat treatment by controlling the carbon content in the initial austenite to be low, and thus the stretch flanging properties can be improved. In addition, the elongation can be increased by adding silicon (Si) and aluminum (Al) to suppress the formation of carbides, thereby purifying ferrite.

Further, in order to improve the strength compensation and stretch flanging properties by reducing the carbon content, the stretch flanging properties may be further improved by adding titanium (Ti) to refine the crystal grains, thereby forming a mesh structure of soft martensite at the ferrite grain boundary. The material and bending anisotropy can be suppressed by controlling the martensite band structure formed in the manganese (Mn) enriched layer through the addition of titanium (Ti).

Therefore, in the case of the ultra-high strength cold rolled steel sheet according to the technical spirit of the present invention, it is possible to provide high elongation and excellent stretch flanging properties by realizing a dual phase structure composed of soft martensite and ferrite composed of a mesh structure even at a low cooling rate of less than 50° C./sec in conventional continuous galvanizing line (CGL) and continuous annealing line (CAL) facilities.

The hole expandability, i.e., stretch flanging properties can be maximized by forming a bainite phase having an intermediate hardness in order to reduce the interphase hardness difference in the conventional art and manufacturing a steel material including a microstructure composed of a 20% to 30% fraction of ferrite, a 30% to 40% fraction of bainite, and a 40% or less fraction of martensite, thereby reducing the interphase hardness difference ratio. However, when such an intermediate phase such as bainite is included, elongation may not be sufficiently secured due to a decrease in the relatively soft ferrite phase.

Further, the stretch flanging properties and elongation can be improved by manufacturing dual phase steel containing ferrite and tempered martensite in another conventional art, thereby softening martensite through a tempering treatment. However, in this case, there is a problem in that a cooling rate of 50° C./sec or more and an investment in a reheating facility to temper martensite after cooling are required, and there is a disadvantage in that it is not easy to control the shape of the steel sheet during rapid cooling.

The ultra-high strength cold rolled steel sheet according to the technical spirit of the present invention can improve press formability by utilizing a dual phase structure to secure low yield and high ductility. In addition, the stretch flanging properties can be improved since the hole expandability can be improved by reducing the interphase hardness difference between the ferrite and martensite structures in the dual phase structure. In addition, excellent spot weldability can be provided due to a low carbon content. In addition, the steel sheet has excellent flatness by forming a hard phase such as martensite at a low cooling rate of 50° C./sec or less.

Hereinafter, the ultra-high strength cold rolled steel sheet according to the technical spirit of the present invention will be described in detail.

The ultra-high strength cold rolled steel sheet according to one embodiment of the present invention comprise, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur (S), 0.004% to 0.006% of nitrogen (N), and the balance of iron (Fe) and other unavoidable impurities.

The carbon equivalent ($C_{eq}$) of the ultra-high strength cold rolled steel sheet is as shown in Equation 1.

$$C_{eq}=[C]+[Si]/30+[Mn]/20+2[P]+4[S] \quad \text{[Equation 1]}$$

In Equation 1, [C], [Si], [Mn], [P], and [S] are contents of carbon (C), silicon (Si), manganese (Mn), phosphorus (P), and sulfur (S) contained in the steel material, and each unit is weight %.

The ultra-high strength cold rolled steel sheet may have a carbon equivalent ($C_{eq}$) of, for example, 0.25 or less, and may have a carbon equivalent range of, for example, 0.20 to 0.25. When the carbon equivalent is less than 0.2, a decrease in strength may occur. When the carbon equivalent exceeds 0.25, the spot weldability may be reduced.

Hereinafter, the role and content of each component contained in the ultra-high strength cold rolled steel sheet according to the present invention will be described as follows. At this time, the contents of the component elements all mean weight % with respect to the entire steel sheet.

Carbon (C): 0.05% to 0.09%

Carbon is dissolved in austenite in the steel material and causes an increase in the strength of martensite after final cooling, which is effective in increasing the strength of the material. When carbon is contained in an amount of less than 0.05%, the strength increasing effect may be insufficient. When carbon is contained in an amount exceeding 0.09%, the martensite strength may be increased, the interphase hardness difference between ferrite and martensite may be increased to decrease the hole expandability, and the carbon equivalent may be increased to reduce the spot weldability. Therefore, it is preferable to add carbon in an amount of 0.05% to 0.09% of the total weight of the steel sheet.

Silicon (Si): 0.5% to 1.0%

Silicon, as a ferrite stabilizing element, is effective in improving the work hardening index by being dissolved in ferrite to increase ferrite strength and increase dislocation density in ferrite. When silicon is contained in an amount of less than 0.5%, strength and elongation may be reduced. When silicon is contained in an amount exceeding 1.0%, a silicon-based oxide is formed on the surface so that the surface and plating properties may be reduced. Therefore, it is preferable to add silicon in an amount of 0.5% to 1.0% of the total weight of the steel sheet.

Manganese (Mn): 2.0% to 2.8%

Manganese is a hardenable element, and stabilizes austenite during cooling so that the formation of third phases such as pearlite and bainite can be suppressed, and it is possible to facilitate the dual phase separation of ferrite and martensite even at a low cooling rate. When manganese is contained in an amount of less than 2.0%, the third phases may be formed and the strength may be reduced. When manganese is contained in an amount exceeding 2.8%, the strength of the hot rolled material is maximized by suppressing the formation of the third phases even at a very low cooling rate, and a rolling load may be caused during cold rolling. In addition, bendability can be reduced by forming a band structure in which manganese is enriched. Therefore, it is preferable to add manganese in an amount of 2.0% to 2.8% of the total weight of the steel sheet.

Aluminum (Al): 0.2% to 0.5%

Aluminum, as a ferrite purifying element, can improve ductility of ferrite by suppressing carbide precipitation in ferrite. In the case of the plating material, since the oxidizing power is strong, aluminum is first oxidized inside the steel material, thereby suppressing the formation of silicon-based oxide in the surface layer portion to enable plating properties to be improved. When aluminum is contained in an amount of less than 0.2%, the effect of improving plating properties and elongation may be insignificant. When aluminum is contained in an amount exceeding 0.5%, the A1 and A3 transformation points are increased so that high temperature annealing may be required to secure the fraction of austenite in the initial annealing region. Therefore, it is preferable to add aluminum in an amount of 0.2% to 0.5% of the total weight of the steel sheet.

Chromium (Cr): 0.8% to 1.2%

Chromium is a component that improves the hardenability of steel, and may secure strength by facilitating the formation of a martensite structure even at a low cooling rate. When chromium is contained in an amount of less than 0.8%, the strength and elongation may be reduced by forming pearlite and bainite during cooling. When chromium is contained in an amount exceeding 1.2%, the manufacturing cost is relatively increased and the quenching effect during cooling is large to cause an increase in strength, and thus the elongation may be relatively reduced. Accordingly, it is preferable to add chromium in an amount of 0.8% to 1.2% of the total weight of the steel sheet.

Molybdenum (Mo): 0.05% to 0.10%

Molybdenum is a component that improves the hardenability of steel, and may secure strength by facilitating the formation of a martensite structure even at a low cooling rate. When molybdenum is contained in an amount of less than 0.05%, the strength and elongation may be reduced by forming pearlite and bainite during cooling. When molybdenum is contained in an amount exceeding 0.10%, the manufacturing cost is relatively increased and the quenching effect during cooling is large to cause an increase in strength, and thus the elongation may be relatively reduced. Therefore, it is preferable to add molybdenum in an amount of 0.05% to 0.10% of the total weight of the steel sheet.

Titanium (Ti): 0.03% to 0.06%

Titanium combines with nitrogen in steel to form TiN and suppresses BN formation, thereby having an effect of maximizing the quenching effect of solid solution boron. Effective solid solution titanium can refine crystal grains by forming fine precipitates such as titanium carbide (TiC) or titanium nitride (TiN). This crystal grain refinement effect promotes the formation of a mesh structure at the ferrite grain boundary of martensite in the composite structure of ferrite and martensite, and this mesh structure disperses local stress during press deformation to suppress the destruction of the interphase interface between ferrite and martensite, thereby enabling properties such as hole expandability and bendability to be improved. Therefore, in the present invention, effective titanium dissolved in solid solution other than titanium carbide or titanium nitride may be contained in an amount of 0.01 wt % to 0.04 wt %. When titanium is contained in an amount of less than 0.03%, the formation of BN and TiC becomes difficult, and the effect of improving properties such as strength, hole expandability, and bendability may be insignificant. When titanium is contained in an amount exceeding 0.06%, the yield strength and tensile strength are rapidly increased due to excessive precipitation hardening, and thus the elongation may be rapidly reduced. Therefore, it is preferable to add titanium in an amount of 0.03% to 0.06% of the total weight of the steel sheet.

Boron (B): 0.001% to 0.003%

As a hardenable element of steel, boron can segregate at grain boundaries during cooling to suppress the formation of ferrite. When boron is contained in an amount of less than 0.001%, hardenability may be lowered to reduce strength. When boron is contained in an amount exceeding 0.003%, strength may be excessively increased, and in the case of a plating material, plating peeling or the like may occur. Therefore, it is preferable to add boron in an amount of 0.001% to 0.003% of the total weight of the steel sheet.

Antimony (Sb): 0.02% to 0.05%

Antimony segregates at grain boundaries in steel to suppress surface diffusion of silicon, thereby enabling the formation and shape of surface silicon oxides to be controlled. Accordingly, it is possible to improve surface properties such as hot rolled red type and surface properties of the plating material. When antimony is contained in an amount of less than 0.02%, the surface control effect may be insufficient. When antimony is contained in an amount exceeding 0.05%, it may segregate at grain boundaries to cause brittleness of the slab. Accordingly, it is preferable to add antimony in an amount of 0.02% to 0.05% of the total weight of the steel sheet.

Phosphorus (P): 0.001% to 0.015%

Phosphorus is an element with a large solid solution strengthening effect in steel and can improve material strength. Phosphorus may be contained as an impurity included in the manufacturing process of steel. When phosphorus is contained in an amount of less than 0.001%, the effect of increasing the strength is small, and the process cost for dephosphorization may be increased. When phosphorus is contained in an amount exceeding 0.015%, it may segregate at grain boundaries to reduce the toughness of steel and weldability of the material. Therefore, it is preferable to add phosphorus in an amount of 0.001% to 0.015% of the total weight of the steel sheet.

Sulfur (S): More than 0% to 0.003%

Sulfur, as an impurity element in steel, may combine with Mn to form MnS inclusions, thereby enabling part formability such as bending to be reduced. Therefore, it is preferable to limit the sulfur content to more than 0% to 0.003% of the total weight of the steel sheet.

Nitrogen (N): 0.004% to 0.006%

Since nitrogen is an element that is unavoidably contained during the manufacture of steel and is an element that deteriorates aging resistance, it is desirable to reduce nitrogen as much as possible. Therefore, it is preferable to limit the nitrogen content to 0.004% to 0.006% of the total weight of the steel sheet.

The remaining component of the ultra-high strength cold rolled steel sheet is iron (Fe). However, since unintended impurities from raw materials or the surrounding environment may inevitably be mixed in the normal steelmaking process, it cannot be excluded. Since these impurities are known to any person skilled in the art of a conventional manufacturing process, all contents thereof are not specifically mentioned in the present specification.

The ultra-high strength cold rolled steel sheet manufactured through the manufacturing method to be described later by controlling the specific components of the aforementioned alloy composition and the content ranges thereof may satisfy a yield strength (YP) of 480 MPa or more, a tensile strength (TS) of 820 MPa or more, an elongation (El) of 5% or more, and a bendability (R/t) at an angle of 60 degrees of 2.5 or less. The ultra-high strength cold rolled steel sheet may satisfy, for example, a yield strength (YS) of 480 MPa to 810 MPa, a tensile strength (TS) of 820 MPa to 1,300 MPa, an elongation (EL) of 5% to 20%, and a bendability (R/t) at an angle of 60 degrees of 0.3 to 2.5.

The ultra-high strength cold rolled steel sheet may satisfy a VDA bending angle in the vertical direction of 90 degrees to 130 degrees, a VDA bending angle in the parallel direction of 70 degrees to 105 degrees, a punch hole expandability of 30% to 70%, a wire hole expandability of 70% to 160%, an LDH of 40 to 60, and an LDR of 90 to 130.

FIG. 1 is a schematic diagram showing the microstructure of an ultra-high strength cold rolled steel sheet according to one embodiment of the present invention.

Referring to FIG. 1, dual phase steel as a comparative example may have a microstructure composed of a dual phase structure of ferrite and martensite.

On the other hand, the ultra-high strength cold rolled steel sheet of the embodiment according to the technical spirit of the present invention may include a microstructure composed of ferrite and low hardness martensite. Ferrite may have a fraction, for example, in a range of 50% to 60%, and low hardness martensite may have a fraction, for example, in a range of 40% to 50%. The fraction means an area ratio derived from the microstructure photograph of the cold rolled steel sheet through an image analyzer.

Ferrite or low hardness martensite may have a crystal grain size, for example, in a range of 1 μm to 5 μm.

Low hardness martensite may mean martensite having a relatively low hardness. Low hardness martensite may have an average hardness range of, for example, 3.5 GPa to 4.5 GPa. Ferrite may have an average hardness range of, for example, 3.0 GPa to 4.3 GPa. For reference, general high hardness martensite may have an average hardness range of, for example, 6.0 GPa to 7.0 GPa.

Such a hardness can be measured using a nano indenter. In the case of ferrite, it may be obtained by averaging the measured values at 1,500 points of low hardness, and in the case of low hardness martensite or martensite, it may be obtained by averaging the measured values at 2,500 points of high hardness.

An average interphase hardness difference between ferrite and low hardness martensite may be in a range of, for example, more than 0 GPa to 1.0 GPa. The average hardness difference ratio, which is a ratio of the average hardness of ferrite to the average hardness of low hardness martensite, may be in a range of, for example, 70% to less than 100%.

Low hardness martensite is composed of a first low hardness martensite and a second low hardness martensite, the first low hardness martensite is spaced apart by ferrite, and the second low hardness martensite is formed at a crystal grain boundary of ferrite to connect the first low hardness martensite so that a mesh structure may be formed.

The second low hardness martensite may have a size ratio, which is a ratio of the minor axis length to the major axis length, in a range of 0.5 to 1.0.

Ferrite, low hardness martensite, or both thereof may include, for example, titanium precipitates such as TiC, TiN, or the like.

Hereinafter, a method for manufacturing an ultra-high strength cold rolled steel sheet according to the present invention will be described with reference to the accompanying drawings.

Manufacturing Method of Ultra-High Strength Cold Rolled Steel Sheet

Figure 2:
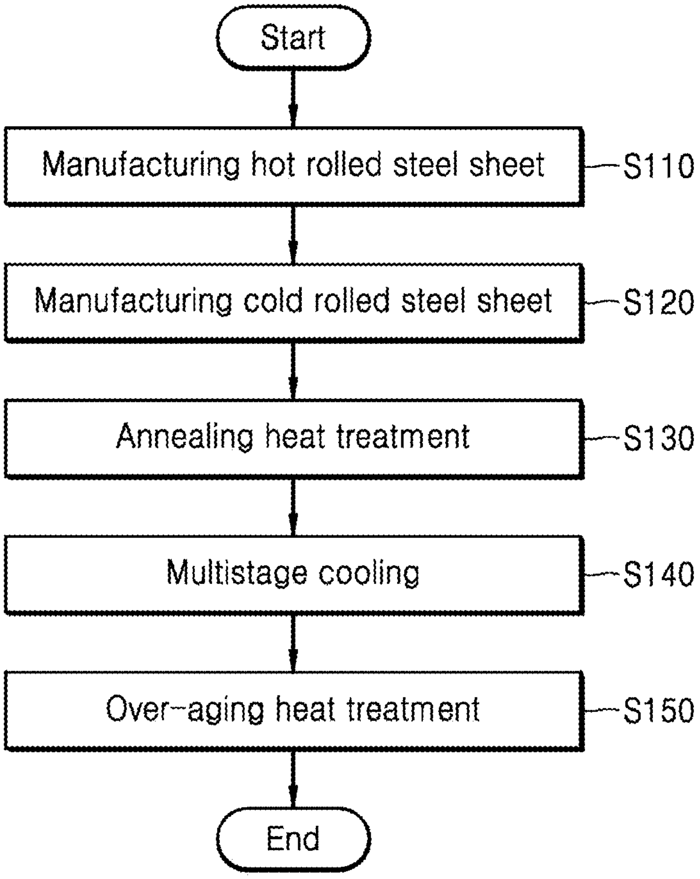
FIG. 2 is a process flowchart schematically illustrating a method for manufacturing an ultra-high strength cold rolled steel sheet according to Example of the present invention.

FIG. 2 is a process flowchart schematically illustrating a method for manufacturing an ultra-high strength cold rolled steel sheet according to Example of the present invention.

Referring to FIG. 2, the method for manufacturing an ultra-high strength cold rolled steel sheet according to the embodiment of the present invention comprises the steps of: manufacturing a hot rolled steel sheet using a steel material of the composition (S110); manufacturing a cold rolled steel sheet by cold rolling the hot rolled steel sheet (S120); annealing heat-treating the cold rolled steel sheet (S130); multistage-cooling the cold rolled steel sheet (S140); and over-aging heat-treating the cold rolled steel sheet (S150).

Specifically, the method may comprise the steps of: manufacturing a hot rolled steel sheet comprising, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur (S), 0.004% to 0.006% of nitrogen (N), and the balance of iron (Fe) and other unavoidable impurities (S110); manufacturing a cold rolled steel sheet by cold rolling the hot rolled steel sheet (S120); heating the cold rolled steel sheet at a temperature raising rate in a range of 3° C./sec to 20° C./sec to annealing heat-treat the cold rolled steel sheet at a temperature in a range of 790° C. to 840° C. (S130); multistage-cooling the annealing heat-treated cold rolled steel sheet (S140); and subjecting the multistage-cooled cold rolled steel sheet to over-aging heat treatment in a temperature range of 250° C. to 350° C. (S150).

In the method for manufacturing an ultra-high strength cold rolled steel sheet according to the present invention, a semi-finished product that is a target steel material may be, for example, a slab. A slab in the semi-finished state can be obtained through the continuous casting process after obtaining molten steel of a predetermined composition through the steelmaking process.

Hot Rolled Steel Sheet Manufacturing Step (S110)

In the hot rolled steel sheet manufacturing step (S110), a hot rolled steel sheet is manufactured by hot rolling a steel material of the above-described composition.

A steel material having the alloy composition is prepared, and the steel material is reheated, for example, at a slab reheating temperature (SRT) ranging from 1,180° C. to 1,220° C. Through such reheating, the austenizing treatment is performed by destroying the cast structure, and at this time, the segregated components and precipitates are redissolved, homogenized, and can be made into a state capable of hot rolling. When the reheating temperature is less than 1,180° C., solid solution re-dissolution of segregation may be insufficient, and the hot rolling load may be increased. When the reheating temperature exceeds 1,220° C., the size of austenite crystal grains may increase, and process costs according to the temperature increase may increase.

A hot rolled steel sheet may be manufactured by performing hot rolling by a conventional method after the reheating, and performing hot finish rolling, for example, at a finish delivery temperature (FDT) ranging from 880° C. to 950° C. When the finish delivery temperature is less than 880° C., ferrite or pearlite may be produced. When the finish delivery temperature exceeds 950° C., scale production is increased, and the crystal grain particle diameter is coarsened so that micro-uniformization of the structure may be difficult.

Subsequently, the hot rolled steel sheet is cooled to, for example, a coiling temperature ranging from 400° C. to 700° C. The cooling may be possible by either air cooling or water cooling, and may be performed, for example, at a cooling rate of 5° C./sec to 150° C./sec. A faster cooling rate is advantageous in reducing the average crystal grain size. It is preferable to perform the cooling to the coiling temperature.

Subsequently, the hot rolled steel sheet is coiled, for example, at a coiling temperature (CT) ranging from 400° C. to 700° C. The coiling temperature range may be selected from the viewpoint of cold rolling properties and surface properties. When the coiling temperature is less than 400° C., a hard phase such as martensite or the like is excessively produced, and the material of the hot rolled steel sheet is excessively increased so that the rolling load during cold rolling may remarkably increase. When the coiling temperature exceeds 700° C., it may lead to non-uniformity of the microstructure of the final product.

The microstructure of the hot rolled steel sheet may have a mixed structure in which ferrite, bainite, and martensite are mixed.

Cold Rolled Steel Sheet Manufacturing Step (S120)

In the cold rolled steel sheet manufacturing step (S120), the hot rolled steel sheet is cold rolled to manufacture a cold rolled steel sheet.

The hot rolled steel sheet is subjected to a pickling treatment for washing it with an acid in order to remove the surface scale layer. Subsequently, the hot rolled steel sheet is subjected to cold rolling at an average reduction ratio of, for example, 40% to 80% to form a cold rolled steel sheet. As the average reduction ratio is higher, there is an effect of increasing the formability due to the structure refinement effect. When the average reduction ratio is less than 40%, it is difficult to obtain a uniform microstructure. When the average reduction ratio exceeds 80%, the roll force is increased to increase the process load.

A thickness of the steel sheet finally produced by the cold rolling may be obtained. The structure of the cold rolled steel sheet may have a structure with a shape in which the structure of the hot rolled steel sheet is stretched.

Annealing Heat Treatment Step (S130)

In the annealing heat treatment step (S130), the cold rolled steel sheet is annealing heat-treated in a continuous annealing furnace having a normal slow cooling section. The annealing heat treatment is performed in order to secure the austenite structure as a fraction of 40% or more. In addition, the carbon concentration in austenite is controlled to less than 0.1 wt %.

In the annealing heat treatment, heating is performed, for example, at a temperature raising rate ranging from 3° C./sec to 20° C./sec. When the temperature raising rate is less than 3° C./sec, it takes a long time to reach the target annealing heat treatment temperature, and thus the production efficiency may be reduced and the size of the crystal grains may increase.

The annealing heat treatment may be performed, for example, at a temperature ranging from $Ac_1$ temperature or more to $Ac_3$ temperature or less, for example, at a temperature ranging from 790° C. to 840° C. The temperature range may be an ideal region of ferrite and austenite. When the annealing heat treatment temperature is less than 790° C., the initial austenite fraction is not secured, and thus strength may not be secured. When the annealing heat treatment temperature exceeds 840° C., the initial austenite fraction is increased, and thus it may be difficult to control transformation of third phases such as pearlite and bainite during cooling.

Multistage Cooling Step (S140)

In the multistage cooling step (S140), the annealing heat-treated cold rolled steel sheet is multistage-cooled. The multistage cooling step may be performed in the following two steps.

First, the annealing heat-treated cold rolled steel sheet is primarily cooled to, for example, a primary cooling end temperature of 600° C. to 700° C., for example, at a cooling rate ranging from 1° C./sec to 10° C./sec. When the primary cooling end temperature is less than 600° C., undesirable bainite transformation may occur. When the primary cooling end temperature exceeds 700° C., ferrite transformation occurs excessively, and thus it may not be easy to secure strength.

Subsequently, the primarily-cooled cold rolled steel sheet is secondly cooled to, for example, Ms point or less, for example, a secondary cooling end temperature of 300° C. to 400° C., for example, at a cooling rate ranging from 5° C./sec to 50° C./sec. Since the martensitic transformation starting temperature (Ms) of the cold rolled steel sheet is about 400° C., the secondary cooling is performed at the secondary cooling end temperature that is a temperature lower than the Ms temperature. Accordingly, martensite may be produced while performing the secondary cooling.

Over-Aging Heat Treatment Step (S150)

In the over-aging heat treatment step (S150), the multi-stage-cooled cold rolled steel sheet is over-aging heat-treated to end in a temperature range of 250° C. to 350° C. The over-aging heat treatment step may be performed for 1 to 30 minutes. A tempering effect may be added to martensite formed in the secondary cooling by the over-aging heat treatment, and accordingly, martensite may be changed into low hardness martensite. In addition, retained austenite may be transformed into low hardness martensite. Accordingly, the average interphase hardness difference between ferrite and low hardness martensite may be minimized, and hole expandability and bending properties may be improved.

After completion of the over-aging heat treatment, the cold rolled steel sheet is cooled to room temperature, for example, a temperature ranging from 0° C. to 40° C. The cooling may be performed by air cooling or water cooling.

Ultra-High Strength Plated Steel Sheet

Hereinafter, an ultra-high strength plated steel sheet according to the present invention and a method for manufacturing the same will be described.

An ultra-high strength plated steel sheet such as a hot-dip galvanized steel sheet or an alloyed hot-dip galvanized steel sheet can be formed by using the ultra-high strength cold rolled steel sheet.

The ultra-high strength plated steel sheet may comprise: a base steel sheet; and a hot-dip galvanized layer or alloyed hot-dip galvanized layer formed on the surface of the base steel sheet. The base steel sheet may comprise, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur (S), 0.004% to 0.006% of nitrogen (N), and the balance of iron (Fe) and other unavoidable impurities, and include a microstructure composed of ferrite and low hardness martensite, and the average interphase hardness difference between ferrite and low hardness martensite may be in a range of more than 0 GPa to 1.0 GPa.

The ultra-high strength plated steel sheet manufactured through the manufacturing method to be described later by controlling the specific components of the aforementioned alloy composition and the content ranges thereof may satisfy a yield strength (YP) of 480 MPa or more, a tensile strength (TS) of 820 MPa or more, an elongation (El) of 5% or more, and a bendability (R/t) at an angle of 60 degrees of 2.5 or less. The ultra-high strength cold rolled steel sheet may satisfy, for example, a yield strength (YS) of 480 MPa to 810 MPa, a tensile strength (TS) of 820 MPa to 1,300 MPa, an elongation (EL) of 5% to 20%, and a bendability (R/t) at an angle of 60 degrees of 0.3 to 2.5.

The ultra-high strength plated steel sheet may satisfy a VDA bending angle in the vertical direction of 90 degrees to 130 degrees, a VDA bending angle in the parallel direction of 70 degrees to 105 degrees, a punch hole expandability of 30% to 70%, a wire hole expandability of 70% to 160%, an LDH of 40 to 60, and an LDR of 90 to 130.

The base material of the ultra-high strength plated steel sheet may include a microstructure composed of ferrite and low hardness martensite. Ferrite may have a fraction, for example, in a range of 50% to 60%, and low hardness martensite may have a fraction, for example, in a range of 40% to 50%.

Ferrite or low hardness martensite may have a crystal grain size, for example, in a range of 1 μm to 5 μm.

Low hardness martensite may have an average hardness, for example, in a range of 3.5 GPa to 4.5 GPa. Ferrite may have an average hardness, for example, in a range of 3.0 GPa to 4.3 GPa. For reference, general high hardness martensite may have an average hardness, for example, in a range of 6.0 GPa to 7.0 GPa.

The average interphase hardness difference between ferrite and low hardness martensite may be, for example, in a range of more than 0 GPa to 1.0 GPa. The average hardness difference ratio, which is a ratio of the average hardness of ferrite to the average hardness of low hardness martensite, may be, for example, in a range of 70% to less than 100%.

Low hardness martensite is composed of a first low hardness martensite and a second low hardness martensite, the first low hardness martensite is spaced apart by ferrite, and the second low hardness martensite is formed at a crystal grain boundary of ferrite to connect the first low hardness martensite so that a mesh structure may be formed.

The second low hardness martensite may have a size ratio, which is a ratio of the minor axis length to the major axis length, in a range of 0.5 to 1.0.

Ferrite, low hardness martensite, or both thereof may include, for example, titanium precipitates such as TiC, TiN, or the like.

Hereinafter, a method for manufacturing an ultra-high strength plated steel sheet according to the present invention will be described with reference to the accompanying drawings.

Manufacturing Method of Ultra-High Strength Plated Steel Sheet

Figure 3:
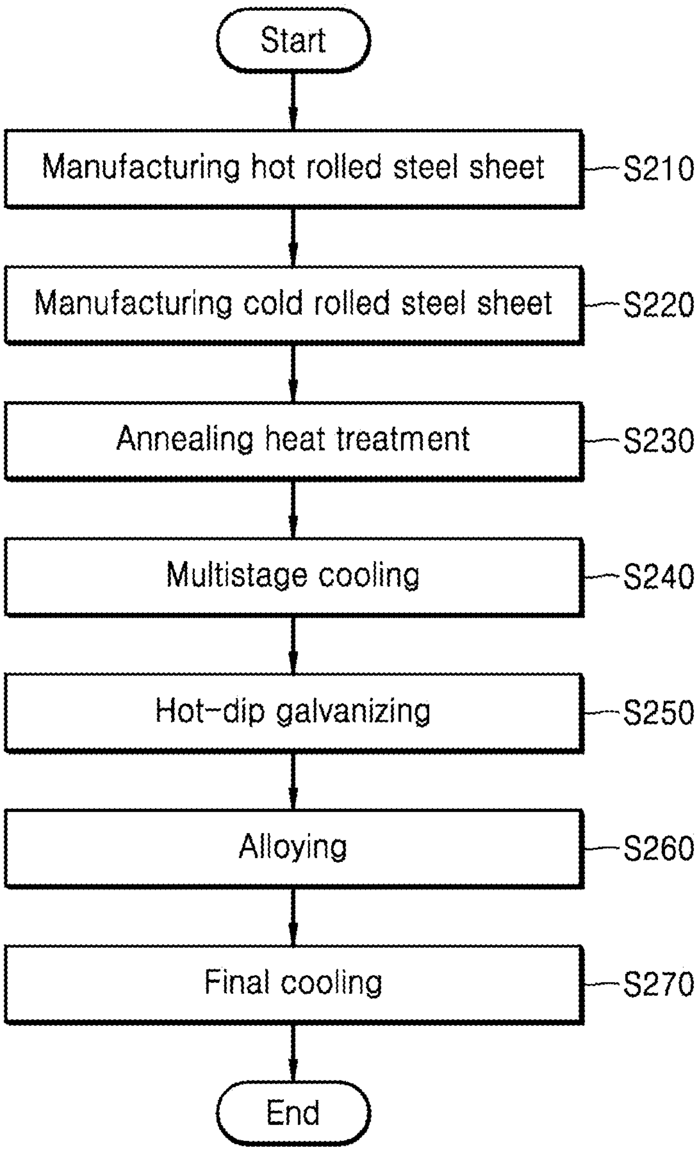
FIG. 3 is a process flowchart schematically illustrating a method for manufacturing an ultra-high strength plated steel sheet according to Example of the present invention.

FIG. 3 is a process flowchart schematically illustrating a method for manufacturing an ultra-high strength plated steel sheet according to Example of the present invention.

Referring to FIG. 3, the method for manufacturing an ultra-high strength plated steel sheet according to the embodiment of the present invention comprises the steps of:

manufacturing a hot rolled steel sheet using a steel material of the composition (S210); manufacturing a cold rolled steel sheet by cold rolling the hot rolled steel sheet (S220); annealing heat-treating the cold rolled steel sheet (S230); multistage-cooling the cold rolled steel sheet (S240); hot-dip galvanizing the cold rolled steel sheet (S250); and finally cooling the hot-dip galvanized cold rolled steel sheet (S270).

Further, the method for manufacturing the ultra-high strength plated steel sheet may further comprise a step (S260) of alloying heat-treating the hot-dip galvanized cold rolled steel sheet after performing the hot-dip galvanizing step (S250).

Specifically, the method for manufacturing the ultra-high strength plated steel sheet may comprise the steps of: manufacturing a hot rolled steel sheet comprising, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur (S), 0.004% to 0.006% of nitrogen (N), and the balance of iron (Fe) and other unavoidable impurities (S210); manufacturing a cold rolled steel sheet by cold rolling the hot rolled steel sheet (S220); heating the cold rolled steel sheet at a temperature raising rate in a range of 3° C./sec to 20° C./sec to annealing heat-treat the cold rolled steel sheet at a temperature in a range of 790° C. to 840° C. (S230); multistage-cooling the annealing heat-treated cold rolled steel sheet (S240); hot-dip galvanizing the multistage-cooled cold rolled steel sheet at a temperature in a range of 460° C. to 500° C. (S250); and finally cooling the hot-dip galvanized cold rolled steel sheet to a temperature in a range of 0° C. to 40° C. (S270).

Further, the method for manufacturing the ultra-high strength plated steel sheet may further comprise a step (S260) of alloying heat-treating the hot-dip galvanized steel sheet at a temperature in a range of 490° C. to 600° C. after performing the hot-dip galvanizing step (S250).

The hot rolled steel sheet manufacturing step (S210) may be the same as the above-described hot rolled steel sheet manufacturing step (S110). The cold rolled steel sheet manufacturing step (S220) may be the same as the above-described cold rolled steel sheet manufacturing step (S120). The annealing heat treatment step (S230) may be the same as the above-described annealing heat treatment step (S130).

Multistage Cooling Step (S240)

In the multistage cooling step (S240), the annealing heat-treated cold rolled steel sheet is multistage-cooled.

First, the annealing heat-treated cold rolled steel sheet is primarily cooled to, for example, a primary cooling end temperature of 600° C. to 700° C., for example, at a cooling rate ranging from 1° C./sec to 10° C./sec. The primary cooling is the same as the primary cooling of the multistage cooling step (S140) described above.

The primarily-cooled cold rolled steel sheet is secondly cooled to, for example, a secondary cooling end temperature of 460° C. to 500° C., for example, at a cooling rate ranging from 5° C./sec to 50° C./sec. In the case of the plated steel sheet, there is a difference in that the secondary cooling end temperature is higher than that of the cold rolled steel sheet described above.

When the secondary cooling end temperature is less than 460° C., the steel sheet temperature is lowered, and thus dross may be generated in a galvanizing bath during galvanizing. When the secondary cooling end temperature exceeds 500° C., the temperature of the galvanizing bath increases, and thus an accident may occur.

Hot-Dip Galvanizing Step (S250)

In the hot-dip galvanizing step (S250), the multistage-cooled cold rolled steel sheet is immersed in a hot-dip galvanizing bath at a temperature, for example, in a range of 460° C. to 500° C. to form a hot-dip galvanized layer on the surface of the cold rolled steel sheet, and thus a hot-dip galvanized steel sheet may be formed. The hot-dip galvanizing step may be performed by, for example, holding the cold rolled steel sheet for a time in a range of 30 seconds to 100 seconds. In the hot-dip galvanizing step (S250), the cold rolled steel sheet may be over-aged. The averaging may be performed before immersing the cold rolled steel sheet in the hot-dip galvanizing bath, and thus the cold rolled steel sheet may be partitioned. In the hot-dip galvanizing step (S250), the hot-dip galvanized steel sheet may have a microstructure in which ferrite and austenite are separated.

Alloying Heat Treatment Step (S260)

An alloyed hot-dip galvanized steel sheet may be formed by subjecting the hot-dip galvanized steel sheet to an alloying heat treatment, for example, at a temperature in a range of 490° C. to 600° C., for example, for a time in a range of 10 seconds to 60 seconds. The alloying heat treatment step (S260) may be performed continuously without performing cooling after performing the previous hot-dip galvanizing step (S250). As the hot-dip galvanized layer is stably grown during the alloying heat treatment under the above conditions, the close adhesion properties of the plating layer may be excellent. When the alloying heat treatment temperature is less than 490° C., the soundness of the hot-dip galvanized layer may deteriorate since alloying does not proceed sufficiently. When the alloying heat treatment temperature exceeds 600° C., material changes may occur while the temperature is passing to a dual phase region temperature section.

Final Cooling Step (S270)

In the final cooling step (S270), the hot-dip galvanized cold rolled steel sheet, that is, the hot-dip galvanized steel sheet or alloyed hot-dip galvanized steel sheet is cooled to room temperature, for example, a temperature in a range of 0° C. to 40° C. The cooling may be performed by air cooling or water cooling. The cooling rate may have a range in which austenite is transformed into low hardness martensite, and it may have, for example, a cooling rate in a range of 1° C./sec to 20° C./sec.

In the finally cooled hot-dip galvanized steel sheet or alloyed hot-dip galvanized steel sheet, austenite may be transformed into low hardness martensite. Since the hot-dip galvanized steel sheet or the alloyed hot-dip galvanized steel sheet does not have a tempering effect due to over-aging, unlike the cold rolled steel sheet, low hardness martensite of a mesh structure may be formed, and thus the hole expandability and bending properties may be improved.

For reference, since low hardness martensite is formed in the final cooling step in the hot-dip galvanized steel sheet, it is required to design the alloy composition or process conditions so that bainite and pearlite are not formed in the hot-dip galvanizing step and the alloying heat treatment step. In the present invention, the contents of manganese, chromium, molybdenum, titanium, and boron are controlled to prevent the formation of bainite and pearlite.

Figure 4:
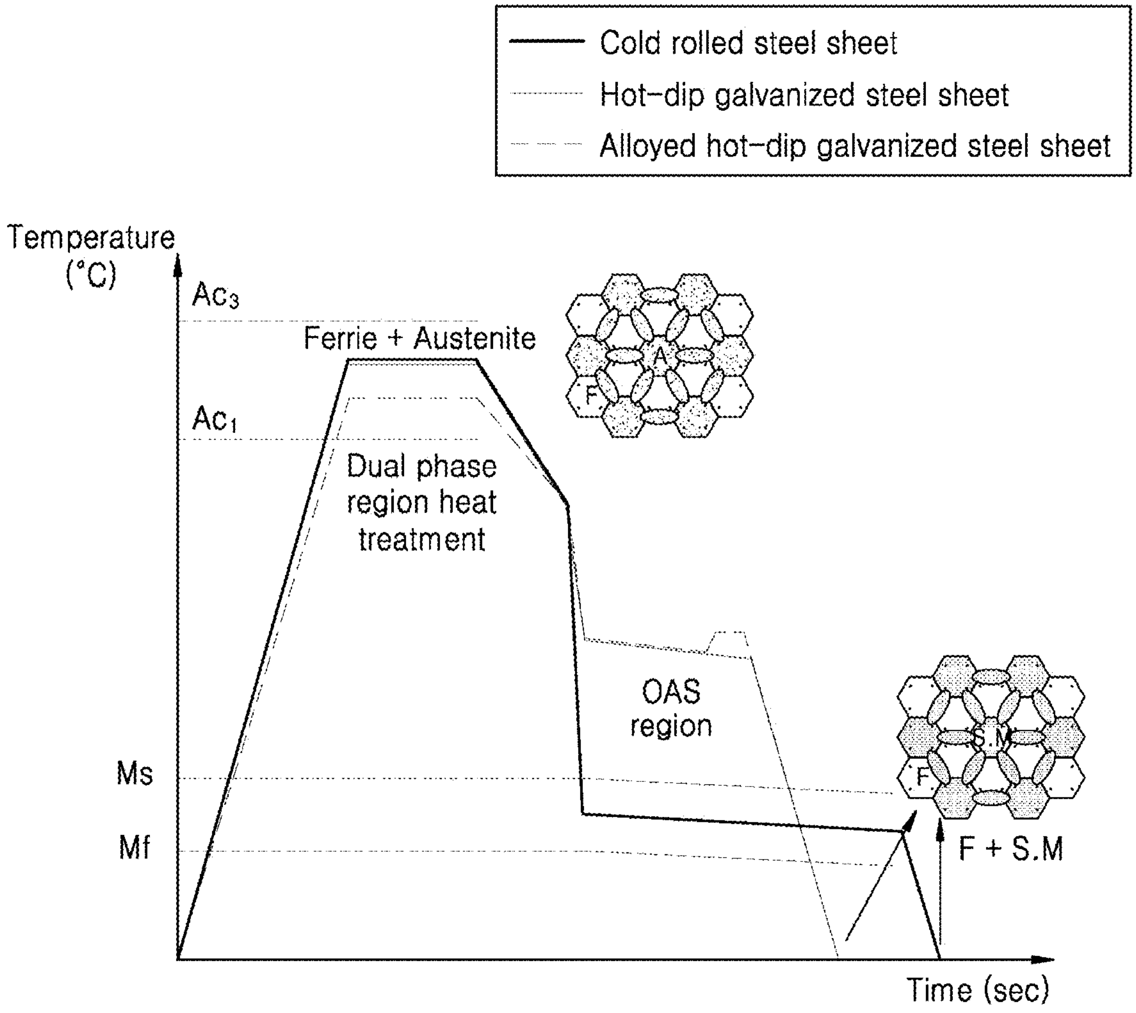
FIG. 4 is a time-temperature graph showing a heat treatment process after cold rolling of an ultra-high strength cold rolled steel sheet according to Example of the present invention.

FIG. 4 is a time-temperature graph showing a heat treatment process after cold rolling of an ultra-high strength cold rolled steel sheet according to Example of the present invention.

Referring to FIG. 4, as described above, after performing annealing heat treatment at a temperature of $Ac_1$ temperature or more to $Ac_3$ temperature or less, for example, at a temperature in a range of 790° C. to 840° C., a microstructure in which ferrite and austenite are separated may be obtained. Austenite may have a mesh structure.

In the case of a cold rolled steel sheet, it is cooled to a martensitic transformation starting temperature (Ms) or less and subjected to over-aging heat treatment at a temperature in a range of 250° C. to 350° C. so that the cold rolled steel sheet may have a microstructure of ferrite and low hardness martensite, and low hardness martensite may have a mesh structure.

The hot-dip galvanized steel sheet and the alloyed hot-dip galvanized steel sheet are annealing heat-treated and then cooled to perform hot-dip galvanizing at a martensitic transformation starting temperature (Ms) or higher, for example, at a temperature in a range of 460° C. to 500° C., and are allowed to have a microstructure of ferrite and low hardness martensite through final cooling. The alloyed hot-dip galvanized steel sheet may be further subjected to an alloying treatment at, for example, 490° C. to 600° C.

Experimental Example

Hereinafter, a preferred experimental example is presented to help the understanding of the present invention. However, the following experimental example is only for helping understanding of the present invention, and the present invention is not limited by the following experimental example.

Steels having the compositions (unit: weight %) shown in Tables 1 and 2 below were prepared, and cold rolled steel sheets according to Examples and Comparative Examples were prepared through predetermined hot and cold rolling processes and heat treatment processes. The balance is iron (Fe).

TABLE 1

| Steel type | C | Si | Mn | Al | Mo | Cr | Ti |
|---|---|---|---|---|---|---|---|
| A | 0.07 | 0.6 | 2.4 | 0.30 | 0.07 | 1.00 | 0.040 |
| B | 0.07 | 0.6 | 2.2 | 0.30 | 0.07 | 1.00 | 0.040 |
| C | 0.12 | 0.6 | 2.4 | 0.30 | 0 | 0.40 | 0.025 |
| D | 0.11 | 1.0 | 2.2 | 0.03 | 0.07 | 0.40 | 0 |
| E | 0.10 | 0.6 | 2.4 | 0.30 | 0 | 0 | 0 |

TABLE 2

| Steel type | B | Sb | P | S | N | Ceq |
|---|---|---|---|---|---|---|
| A | 0.002 | 0.03 | 0.012 | 0.001 | 0.005 | 0.238 |
| B | 0.002 | 0.03 | 0.012 | 0.001 | 0.005 | 0.228 |
| C | 0 | 0 | 0.012 | 0.001 | 0.005 | 0.288 |
| D | 0 | 0 | 0.012 | 0.001 | 0.005 | 0.281 |
| E | 0 | 0 | 0.012 | 0.001 | 0.005 | 0.268 |

Referring to Tables 1 and 2, steel type A and steel type B are Examples of the present invention, and steel type C, steel type D, and steel type E are Comparative Examples in which the carbon contents are higher than the upper limit of the range of the present invention.

Table 3 shows the heat treatment process conditions of Comparative Examples and Examples.

TABLE 3

| Classification | Steel type | Type | Coiling temperature (° C.) | Annealing temperature (° C.) | Primary cooling end temperature (° C.) | Secondary cooling end temperature (° C.) |
|---|---|---|---|---|---|---|
| Example 1 | A | Galvanized | 620 | 810 | 700 | 480 |
| Example 2 | A | Galvanized | 620 | 830 | 700 | 480 |
| Example 3 | B | Galvanized | 620 | 810 | 700 | 480 |
| Example 4 | B | Galvanized | 620 | 830 | 700 | 480 |
| Example 5 | A | Cold rolled steel sheet | 620 | 810 | 650 | 300 |
| Example 6 | A | Cold rolled steel sheet | 620 | 830 | 650 | 300 |
| Example 7 | B | Cold rolled steel sheet | 620 | 810 | 650 | 300 |
| Example 8 | B | Cold rolled steel sheet | 620 | 830 | 650 | 300 |
| Comparative Example 1 | C | Galvanized | 620 | 830 | 700 | 480 |
| Comparative Example 2 | E | Galvanized | 620 | 830 | 700 | 480 |
| Comparative Example 3 | D | Cold rolled steel sheet | 620 | 830 | 650 | 300 |
| Comparative Example 4 | E | Cold rolled steel sheet | 620 | 830 | 650 | 300 |

In Table 3, "cold rolled steel sheet" means CR material that has not been subjected to galvanizing, and "galvanized" means a hot-dip galvanized steel sheet. In the case of the hot-dip galvanized steel sheets, galvanizing was performed at a secondary cooling end temperature of 480° C., and in the case of the cold rolled steel sheets, galvanizing was performed at a secondary cooling end temperature of 300° C.

Table 4 is a table showing the microstructure characteristics of Comparative Examples and Examples.

TABLE 4

| Classification | Structure | Crystal grain size (μm) Ferrite | Martensite | Size ratio (S.R) | Volume fraction (%) Ferrite | Martensite |
|---|---|---|---|---|---|---|
| Example 1 | F + M | 2.74 | 1.64 | 0.73 | 48 | 52 |
| Example 2 | F + M | 2.28 | 1.75 | 0.75 | 39 | 61 |
| Example 3 | F + M | 2.94 | 1.78 | 0.69 | 57 | 41 |
| Example 4 | F + M | 2.87 | 1.89 | 0.72 | 54 | 46 |
| Example 5 | F + M | 2.69 | 1.58 | 0.72 | 47 | 53 |
| Example 6 | F + M | 2.30 | 1.72 | 0.76 | 37 | 63 |
| Example 7 | F + M | 2.87 | 1.75 | 0.67 | 57 | 43 |
| Example 8 | F + M | 2.85 | 1.81 | 0.70 | 52 | 48 |
| Comparative Example 1 | F + M | 3.57 | 2.01 | 0.58 | 58 | 42 |
| Comparative Example 2 | F + M | 4.09 | 2.22 | 0.52 | 68 | 32 |
| Comparative Example 3 | F + M | 3.56 | 2.69 | 0.42 | 62 | 38 |
| Comparative Example 4 | F + M | 4.01 | 2.15 | 0.49 | 65 | 35 |

Referring to Table 4, Comparative Examples 3 and 4 showed martensite size ratios of less than 0.5. In addition, Comparative Example 2, Comparative Example 3, and Comparative Example 4 showed martensite volume fractions of less than 40%.

Table 5 is a table showing the microhardness and interphase hardness difference of the microstructures of Comparative Examples and Examples.

TABLE 5

| Classification | Ferrite microhardness (GPa) | Martensite microhardness (GPa) | Interphase hardness difference (GPa) | Interphase hardness ratio (%) |
|---|---|---|---|---|
| Example 1 | 3.20 | 4.12 | 0.92 | 78 |
| Example 2 | 3.15 | 4.00 | 0.85 | 79 |
| Example 3 | 3.11 | 4.05 | 0.94 | 77 |
| Example 4 | 3.09 | 3.98 | 0.89 | 78 |
| Example 5 | 3.22 | 4.05 | 0.83 | 80 |
| Example 6 | 3.25 | 4.01 | 0.76 | 81 |
| Example 7 | 3.18 | 4.01 | 0.83 | 79 |
| Example 8 | 3.15 | 3.92 | 0.77 | 80 |
| Comparative Example 1 | 3.22 | 5.89 | 2.67 | 55 |
| Comparative Example 2 | 3.07 | 5.48 | 2.41 | 56 |
| Comparative Example 3 | 4.21 | 6.69 | 2.48 | 63 |
| Comparative Example 4 | 3.20 | 5.28 | 2.08 | 61 |

Referring to Table 5, the interphase hardness difference and the interphase hardness ratio in Examples satisfy the ranges presented by the present invention.

Comparative Examples showed high microhardness of martensite, and thus, they showed that the interphase hardness difference between ferrite and martensite exceeded 1 GPa, and the interphase hardness ratio was less than 70%.

Table 6 is a table showing yield strength, tensile strength, elongation, bending angle, and plating peeling phenomenon as mechanical properties of Comparative Examples and Examples.

TABLE 6

| Classification | Yield strength (MPa) | Tensile strength (MPa) | Elongation (%) | Bending angle (R/t) | Plating peeling |
|---|---|---|---|---|---|
| Example 1 | 612 | 1026 | 16.0 | 60° (1.0) | Not occurred |
| Example 2 | 742 | 1035 | 14.8 | 60° (0.9) | Not occurred |
| Example 3 | 489 | 829 | 19.2 | 180° (1 T) | Not occurred |
| Example 4 | 555 | 831 | 16.1 | 180° (1 T) | Not occurred |
| Example 5 | 627 | 1048 | 15.5 | 60° (1.0) | Not applicable |
| Example 6 | 805 | 1035 | 12.6 | 60° (0.8) | Not applicable |
| Example 7 | 493 | 847 | 18.5 | 180° (1 T) | Not applicable |
| Example 8 | 519 | 838 | 17.9 | 180° (1 T) | Not applicable |
| Comparative Example 1 | 661 | 1105 | 13.8 | 90° (2.0) | Occurred |
| Comparative Example 2 | 485 | 815 | 20.2 | 180° (3 T) | Occurred |
| Comparative Example 3 | 623 | 991 | 17.4 | 90° (2.0) | Not applicable |
| Comparative Example 4 | 481 | 825 | 18.1 | 180° (3 T) | Not applicable |

Referring to Table 6, Examples satisfy the ranges presented by the present invention with respect to yield strength, tensile strength, elongation, and bending angle. In addition, plating peeling did not occur in the hot-dip galvanized steel sheets of Examples.

Among the Comparative Examples, the tensile strength in Comparative Example 2 was lower than the lower limit of the range presented by the present invention, and plating peeling occurred in Comparative Examples 1 and 2.

Table 7 is a table showing the VAD bending angle, hole expandability, LDH, and LDR as mechanical properties of Comparative Examples and Examples.

TABLE 7

| Classification | VDA bending angle (degrees) Vertical | Parallel | Hole expandability (%) Punch | Wire | LDH (mm) | LDR (Φ) |
|---|---|---|---|---|---|---|
| Example 1 | 105.8 | 90.5 | 41.8 | 129.7 | 43.0 | 97 |
| Example 2 | 113.7 | 94.3 | 45.9 | 132.6 | 41.9 | 98 |
| Example 3 | 115.1 | 95.5 | 58.4 | 145.1 | 51.5 | 112 |
| Example 4 | 120.2 | 99.7 | 60.3 | 150.3 | 52.8 | 115 |
| Example 5 | 117.9 | 92.7 | 44.4 | 132.9 | 43.5 | 97 |
| Example 6 | 115.8 | 95.6 | 47.8 | 135.8 | 40.8 | 94 |
| Example 7 | 117.8 | 96.1 | 62.3 | 149.3 | 49.8 | 108 |
| Example 8 | 125.8 | 101.2 | 68.3 | 155.0 | 55.0 | 121.2 |
| Comparative Example 1 | 78.4 | 63.7 | 22.0 | 43.3 | 39.3 | 90 |
| Comparative Example 2 | 82.5 | 66.9 | 25.7 | 65.8 | 45.9 | 101 |
| Comparative Example 3 | 72.7 | 60.2 | 17.4 | 45.0 | 37.6 | 86 |
| Comparative Example 4 | 84.3 | 67.2 | 26.8 | 68.3 | 46.3 | 107 |

Referring to Table 7, Examples satisfy the ranges presented by the present invention with respect to VAD bending angle, hole expandability, LDH, and LDR.

Comparative Examples show VAD bending angle and hole expandability values lower than the lower limits presented by the present invention.

Figure 5:
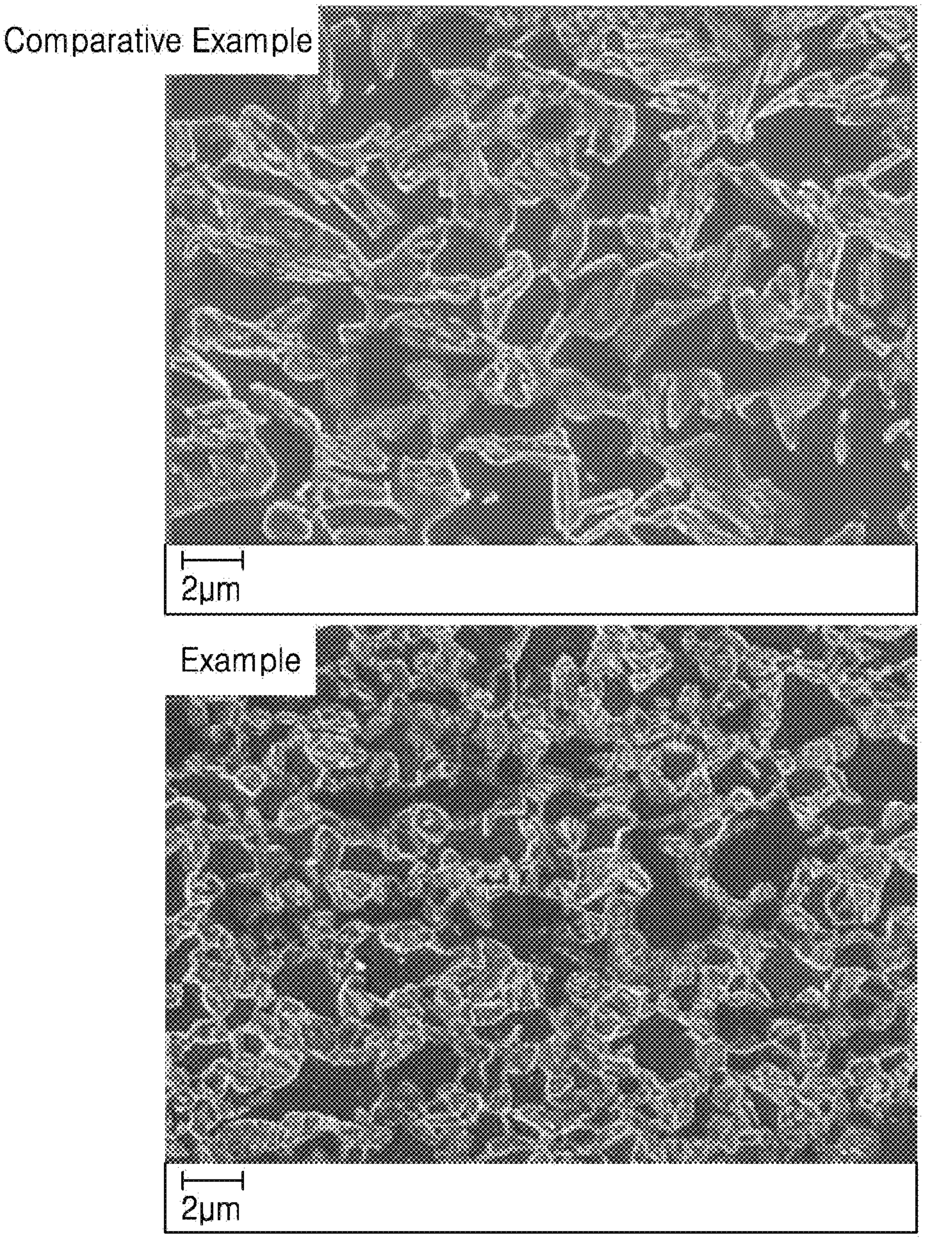
FIG. 5 is scanning electron microscope photographs showing the microstructures of ultra-high strength cold rolled steel sheets according to Examples of the present invention.

FIG. 5 is scanning electron microscope photographs showing the microstructures of ultra-high strength cold rolled steel sheets according to Examples of the present invention.

Referring to FIG. 5, Comparative Example 1 has a microstructure of ferrite and martensite, and martensites are separated. Meanwhile, it can be seen that Example 1 has a microstructure of ferrite and low hardness martensite, and low hardness martensites are connected to each other to form a mesh.

Figure 6:
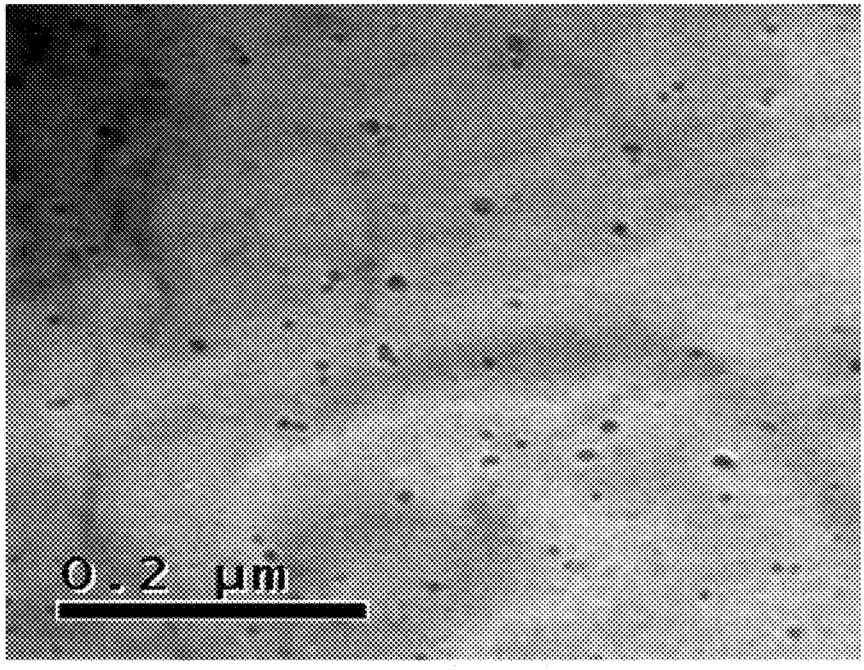
FIG. 6 is a scanning electron microscope photograph showing titanium precipitates in the microstructure of an ultra-high strength cold rolled steel sheet according to Example of the present invention.

FIG. 6 is a scanning electron microscope photograph showing titanium precipitates in the microstructure of an ultra-high strength cold rolled steel sheet according to Example of the present invention.

Figure 7:
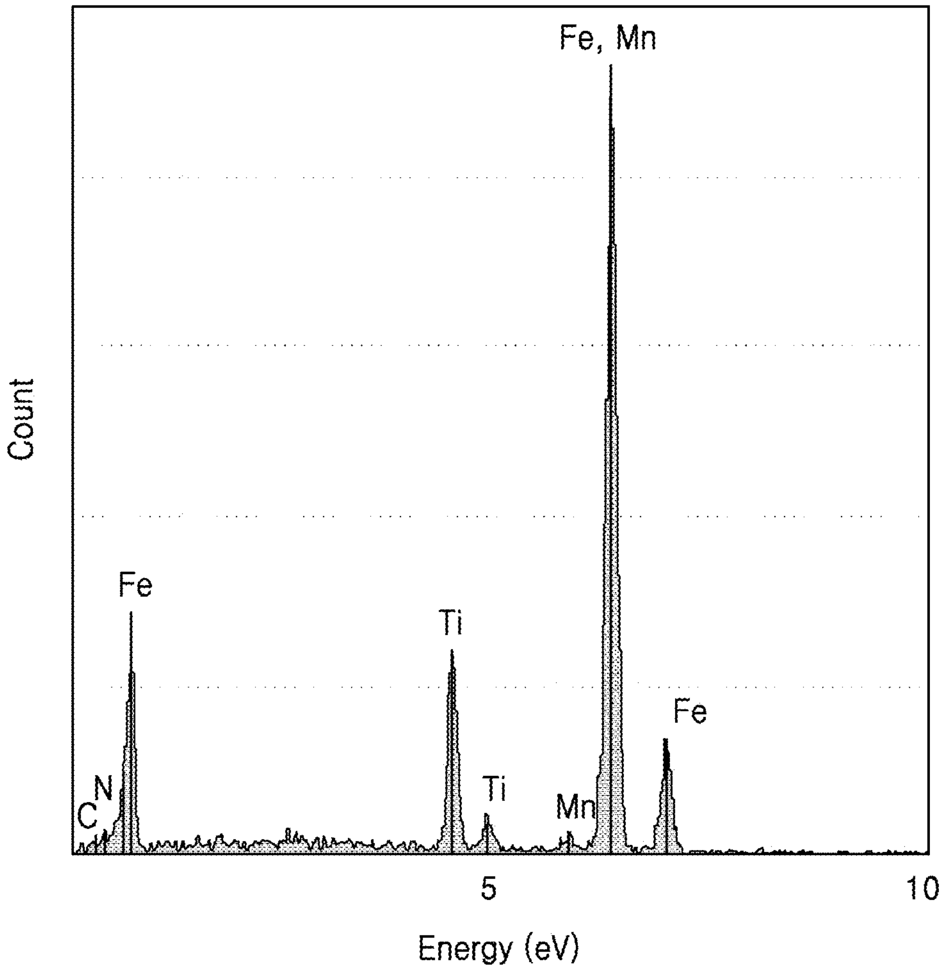
FIG. 7 is a graph showing components of the microstructure of the ultra-high strength cold rolled steel sheet of FIG. 6 according to Example of the present invention.

FIG. 7 is a graph showing components of the microstructure of the ultra-high strength cold rolled steel sheet of FIG. 6 according to Example of the present invention.

Referring to FIGS. 6 and 7, precipitates appearing as small dots on the low hardness martensite matrix are shown, and as a result of elemental analysis, most are analyzed as titanium precipitates, and analyzed as, for example, TiC or TiN. In addition, some are analyzed as manganese precipitates. For reference, the graph of FIG. 7 was obtained using a transmission electron microscope EDAX.

Figure 8:
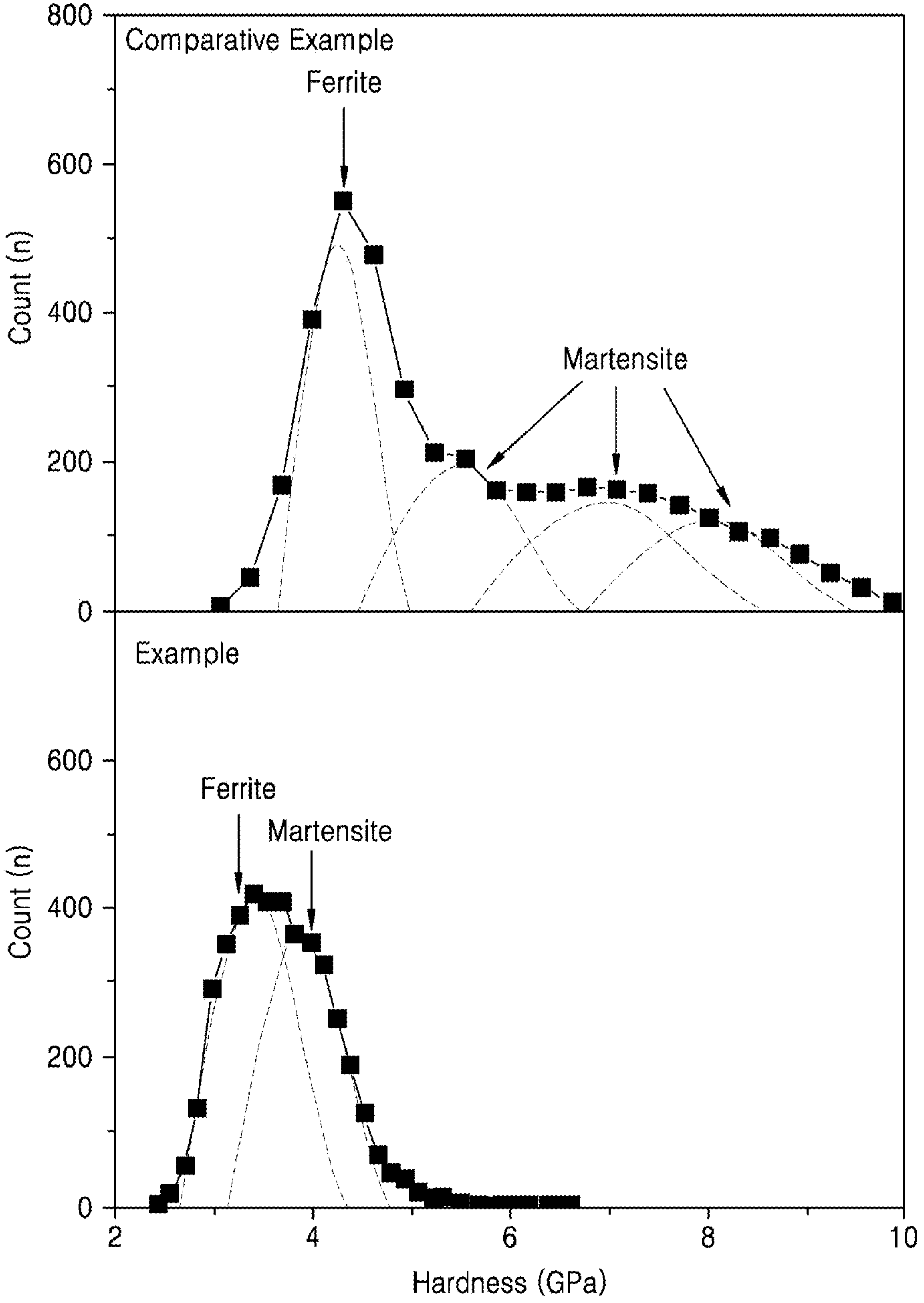
FIG. 8 is graphs showing the hardness of ultra-high strength cold rolled steel sheets according to Examples of the present invention.

FIG. 8 is graphs showing the hardness of ultra-high strength cold rolled steel sheets according to Examples of the present invention.

Referring to FIG. 8, in the case of Comparative Example 1, it showed an average hardness of ferrite of 4.21 GPa, an average hardness of martensite of 6.69 GPa, and an interphase hardness difference of 2.48 GPa. On the other hand, in the case of Example 1, it showed an average hardness of ferrite of 3.15 GPa, an average hardness of martensite of 4.00 GPa, and an interphase hardness difference of 0.85 GPa.

Figure 9:
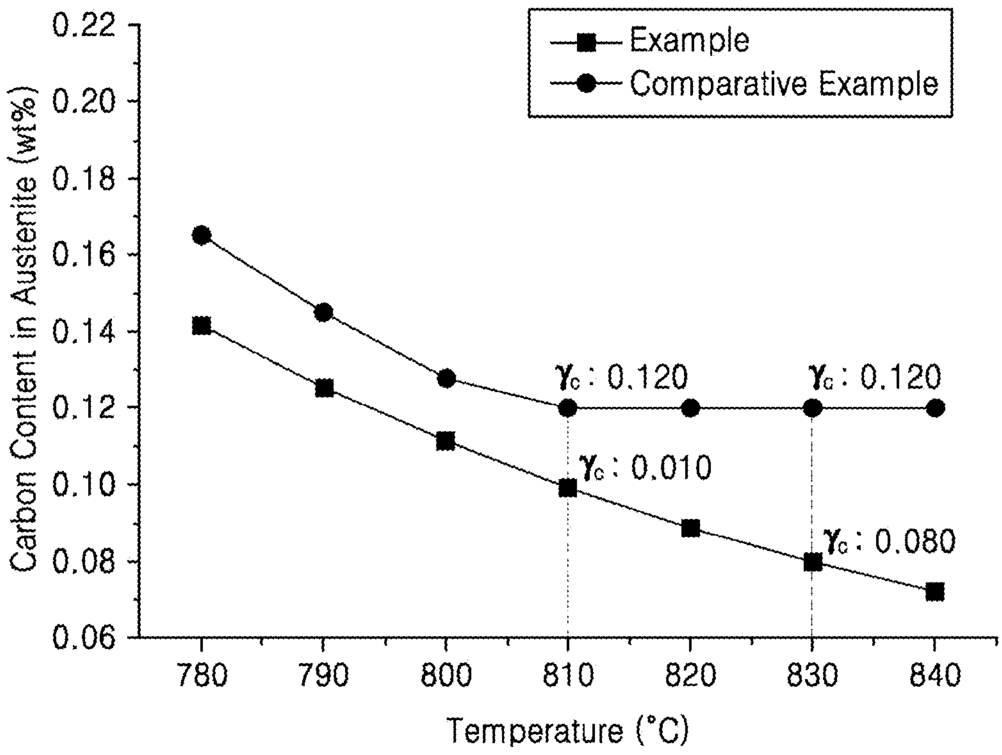
FIG. 9 is a graph showing the carbon contents in austenite according to the temperature of ultra-high strength cold rolled steel sheets according to Examples of the present invention.

FIG. 9 is a graph showing the carbon contents in austenite according to the temperature of ultra-high strength cold rolled steel sheets according to Examples of the present invention.

Referring to FIG. 9, compared to Comparative Example 1, Example 1 showed a low carbon content in austenite, and showed a trend that the carbon content was relatively lower as the temperature increased. Particular, when the temperature was increased to 810° C. or higher, Comparative Example showed almost equal carbon content values, whereas Example showed continuously decreased carbon contents when the temperature was increased to 810° C. or higher.

The technical spirit of the present invention described above is not limited to the above-described Examples and the accompanying drawings, and it will be apparent to those with ordinary skill in the art to which the technical spirit of the present invention pertains that various substitutions, modifications and changes are possible within the scope without departing from the technical spirit of the present invention.

The invention claimed is:

1. An ultra-high strength cold rolled steel sheet comprising, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur(S), 0.004% to 0.006% of nitrogen (N), and the balance of iron (Fe) and other unavoidable impurities, and including a microstructure composed of ferrite and low hardness martensite, wherein low hardness martensite has an average hardness in a range of 3.5 GPa to 4.5 GPa, and wherein low hardness martensite is composed of a first low hardness martensite and a second low hardness martensite, the first low hardness martensite is spaced apart by ferrite, and the second low hardness martensite is formed at a crystal grain boundary of ferrite to connect the first low hardness martensite so that a mesh structure is formed, wherein the average interphase hardness difference between the ferrite and the low hardness martensite is in a range of more than 0 GPa to 1.0 GPa; and wherein ferrite has a fraction in a range of 50% to 60%, and low hardness martensite has a fraction in a range of 40% to 50%.

2. The ultra-high strength cold rolled steel sheet of claim 1, wherein the ferrite or the low hardness martensite has a crystal grain size in a range of 1 μm to 5 μm.

3. The ultra-high strength cold rolled steel sheet of claim 1, wherein the ratio of the average hardness of the ferrite to the average hardness of the low hardness martensite is in a range of 70% to less than 100%.

4. The ultra-high strength cold rolled steel sheet of claim 1, wherein the second low hardness martensite has a ratio of the minor axis length to the major axis length in a range of 0.5 to 1.0.

5. The ultra-high strength cold rolled steel sheet of claim 1, wherein the ferrite, the low hardness martensite, or both thereof includes titanium precipitates.

6. The ultra-high strength cold rolled steel sheet of claim 1, wherein the ultra-high strength cold rolled steel sheet has a carbon equivalent in a range of 0.20 to 0.25 (where $C_{eq}$=[C]+[Si]/30+[Mn]/20+2[P]+4[S]).

7. The ultra-high strength cold rolled steel sheet of claim 1, wherein the ultra-high strength cold rolled steel sheet comprises 0.01 wt % to 0.04 wt % of effective titanium dissolved in solid solution.

8. The ultra-high strength cold rolled steel sheet of claim 1, wherein the ultra-high strength cold rolled steel sheet satisfies a yield strength (YP) of 480 MPa or more, a tensile strength (TS) of 820 MPa or more, an elongation (El) of 5% or more, and a bendability (R/t) at an angle of 60 degrees of 2.5 or less.

9. The ultra-high strength cold rolled steel sheet of claim 1, wherein the ultra-high strength cold rolled steel sheet satisfies a yield strength (YS) of 480 MPa to 810 MPa, a tensile strength (TS) of 820 MPa to 1,300 MPa, an elongation (EL) of 5% to 20%, and a bendability (R/t) at an angle of 60 degrees of 0.3 to 2.5.

10. The ultra-high strength cold rolled steel sheet of claim 1, wherein the ultra-high strength cold rolled steel sheet satisfies a VDA bending angle in the vertical direction of 90 degrees to 130 degrees, a VDA bending angle in the parallel direction of 70 degrees to 105 degrees, a punch hole expandability of 30% to 70%, a wire hole expandability of 70% to 160%, an LDH of 40 to 60, and an LDR of 90 to 130.

11. An ultra-high strength plated steel sheet comprising:

a base steel sheet; and a hot-dip galvanized layer or alloyed hot-dip galvanized layer formed on the surface of the base steel sheet, wherein the base steel sheet comprises, by weight %, 0.05% to 0.09% of carbon (C), 0.5% to 1.0% of silicon (Si), 2.0% to 2.8% of manganese (Mn), 0.2% to 0.5% of aluminum (Al), 0.8% to 1.2% of chromium (Cr), 0.05% to 0.10% of molybdenum (Mo), 0.03% to 0.06% of titanium (Ti), 0.001% to 0.003% of boron (B), 0.02% to 0.05% of antimony (Sb), 0.001% to 0.015% of phosphorus (P), more than 0% to 0.003% of sulfur (S), 0.004% to 0.006% of nitrogen (N), and the balance of iron (Fe) and other unavoidable impurities, and includes a microstructure composed of ferrite and low hardness martensite, and the average interphase hardness difference between the ferrite and the low hardness martensite is in a range of more than 0 GPa to 1.0 GPa, wherein the low hardness martensite has an average hardness in a range of 3.5 GPa to 4.5 GPa, wherein the ferrite has a fraction in a range of 50% to 60%, and low hardness martensite has a fraction in a range of 40% to 50%, and wherein the low hardness martensite is composed of a first low hardness martensite and a second low hardness martensite, the first low hardness martensite is spaced apart by ferrite, and the second low hardness martensite is formed at a crystal grain boundary of ferrite to connect the first low hardness martensite so that a mesh structure is formed.

12. The ultra-high strength plated steel sheet of claim 11, wherein the microstructure is composed on 40% to 50% ferrite and 50% to 60% low hardness martensite.

* * * * *